UNITED STATES PATENT OFFICE.

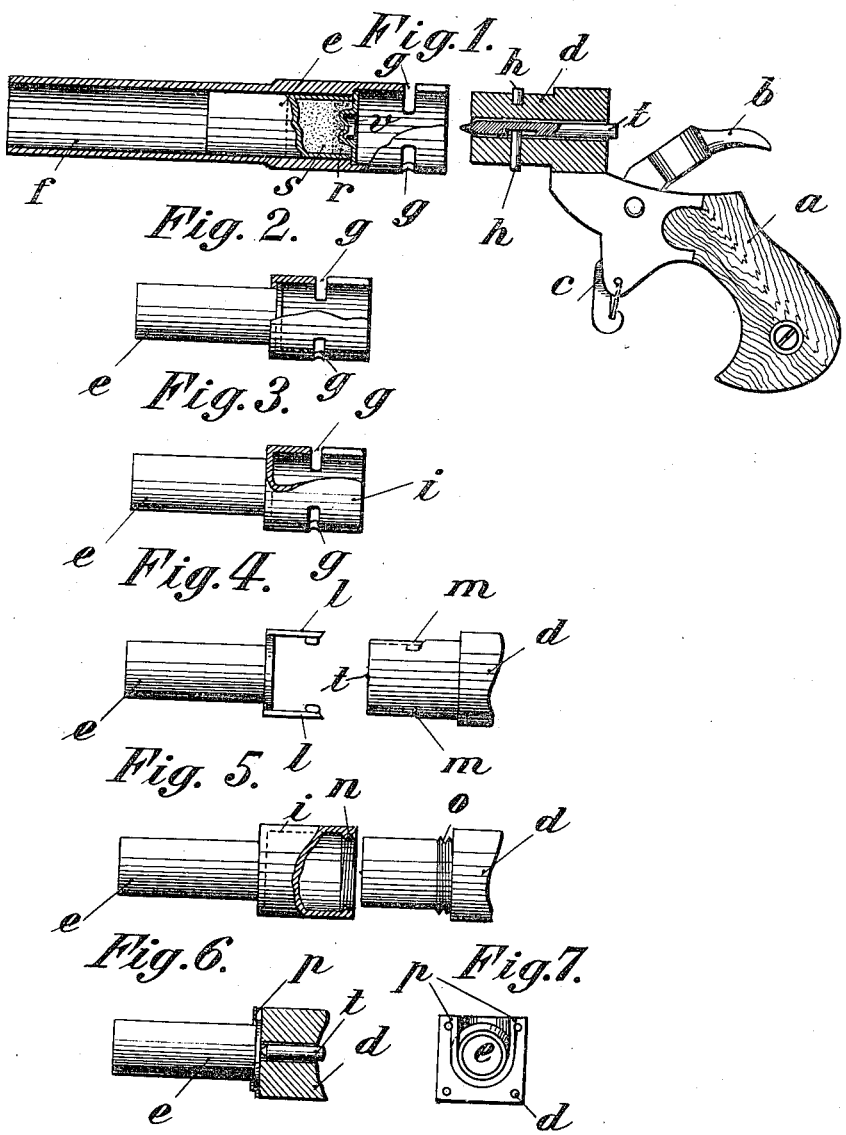

KARL BURGSMÜLLER, OF KREIENSEN, GERMANY.

APPARATUS FOR NARCOTIZING ANIMALS AND THE LIKE.

993,023. Specification of Letters Patent. Patented May 23, 1911.

Application filed November 16, 1909. Serial No. 528,326.

*To all whom it may concern:*

Be it known that I, KARL BURGSMÜLLER, manufacturer, a subject of the Duke of Brunswick, and resident of Nos. 110/111 Holzmindenerstrasse, at Kreiensen, in the Duchy of Brunswick, German Empire, have invented a new and useful Apparatus for Narcotizing Animals and the Like, of which the following is a specification.

This invention makes use of the property of the capsicine gases instantly to narcotize animals, and the like for a few minutes without doing any continuing injury to them, and my invention consists in a very simple device or apparatus, by means of which the narcotizing gas is projected or thrown toward the animals or the like to be narcotized.

The device or apparatus resembles a pistol and is similarly employed, in that a cartridge is fired against the animal or the like, said cartridge containing among other substances also such which contain capsicine, for instance finely pulverized Spanish pepper, said other substances being, besides gunpowder, gun-cotton or the like, also jute, celluloid, or another easily inflammable substance, by which the gasification of the capsicine is accelerated. Here are also appropriate details of construction which will duly be referred to hereinafter.

In order to make my invention more clear, I refer to the accompanying drawing, in which similar letters denote similar parts throughout the several views, and in which:

Figure 1 is a longitudinal section through the apparatus, the rear portion being separated from the front portion, Figs. 2-7 are detail-views, which are duly referred to hereinafter.

To the stock or handle $a$ is secured the breech-block $d$ which contains the needle $t$ and is provided with two pins or projections $h$ arranged one opposite to the other. The stock $a$ is furnished with the spring-actuated hammer $b$ and the trigger $c$. The barrel $f$ has two recesses adapted to receive said projections $h$, by means of which the barrel and the breech-block may be connected with each other.

The cartridge $e$ has a percussion-cap $v$ and contains a small quantity of powder, as well as a mixture of the capsicine-containing body or bodies with an easily inflammable substance or substances, as already mentioned in the preamble. The barrel serves as a guide for the capsicine-gases that afterward issue forth from the mouth of the barrel against the animal to be narcotized. But where the distance between the animal and the apparatus is very short, the shell of the cartridge can guide the gases sufficiently, provided, its length be as usual and the material be of sufficient strength. Such a form of construction is shown in Fig. 2, in which there is, instead of the barrel or comparatively long tube $e$ (Fig. 1), a short piece of tube $i$ having also the recesses $g$ for securing the piece of tube and the cartridge to the breech-block $d$. Fig. 3 shows, that the piece of tube $i$ and the cartridge $e$ may be constantly connected with each other, the tube $i$ being then preferably made in one piece with the bottom of the cartridge. The apparatus consists in this instance practically of two parts only, namely the combined barrel and cartridge and the combined breech block and handle.

Instead of connecting the breech-block $d$ and the barrel or its substitute by pins and recesses, as in Figs. 1-3, numerous other means may be made use of, for instance such as shown in Figs. 4-7. In Fig. 4, the cartridge is provided with two springs $l$, the thickened ends of which are adapted to take into suitable cavities $m$ of the breech-block $d$, so that thereby the cartridge is sufficiently safely held in place. In Fig. 5, the open end of the piece of tube $i$ has an inner thread $n$, and the breech-block has an outer thread $o$ adapted to take into said thread $n$. And in Fig. 6 the laterally projecting bottom of the cartridge takes into a groove formed at the frontal surface of the breech-block by means of a suitably pressed plate $p$ fixed to that surface or end. The particular advantage of this connecting-means resides in the fact that the shape of the cartridge need not be changed in any way.

The means for driving the needle $t$ need not indispensably be those shown but any other of the known means for actuating a needle may be employed.

Having now described my invention, what I desire to secure by a patent of the United States is:

As a means for temporarily narcotizing animals and the like, a cartridge provided with a percussion-cap and filled with a mixture composed of substances containing capsicine in an immediately gasifiable form and of easily inflammable substances adapted to accelerate the gasification, said mixture in combination with a small quantity of an explosive agent located between said mixture and the percussion-cap.

In testimony whereof I have signed my name to this specification in the presence of two subscribing witnesses.

KARL BURGSMÜLLER.

Witnesses:
　JULIUS SECKEL,
　WILLIAM SAX.